Nov. 10, 1925.  
A. H. CARLSON  
1,560,972  
THREE-WHEEL DUMP CART  
Filed June 12, 1924

ANDROV H. CARLSON INVENTOR.

BY *G. H. Braddock*
ATTORNEY.

Patented Nov. 10, 1925.

1,560,972

UNITED STATES PATENT OFFICE.

ANDROV H. CARLSON, OF BRIDGEPORT, CONNECTICUT.

THREE-WHEEL DUMP CART.

Application filed June 12, 1924. Serial No. 719,531.

*To all whom it may concern:*

Be it known that ANDROV H. CARLSON, a subject of the King of Sweden, and resident of Bridgeport, in the county of Fairfield and State of Connecticut, has invented certain new and useful Improvements in Three-Wheel Dump Carts, of which the following is a specification.

This invention relates to a riding toy of three wheel variety having incorporated therein a cart body and mechanism whereby the contents of the cart body can be dumped.

The broad object of the invention is to provide a toy three wheel dump cart possessing novel features and characteristics of construction which will be improvements generally over the structure of the patent to Gilbert and Carlson, No. 1,373,000, for three-wheel dump-cart, granted March 29, 1921.

More specific objects are to provide a toy of the character mentioned which will be of very simple construction and can be manufactured at considerably less expense than can the dump cart of the patent above identified; and to provide in the novel toy, in connection with simple mechanism for dumping the contents of the cart body, an arrangement for locking said cart body in normal position to preclude the possibility of accidental dumping of its contents.

With the above and other objects in view, the invention comprises the construction, arrangement and combination of parts as now to be fully described and as hereinafter to be specifically claimed, it being understood that the disclosure herein is merely illustrative, changes in details of construction and arrangement of parts being permissible so long as within the spirit of the invention and the scope of the appended claims.

In the accompanying drawing forming a part of this specification,

Figure 1:
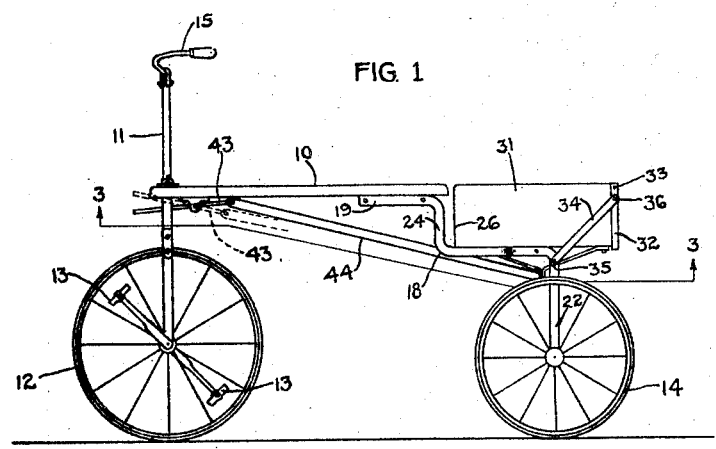
Fig. 1 is an elevational view of a toy in which the features of the invention are incorporated.

With respect to the drawing and the numerals of reference thereon, 10 represents a flat seat, 11 a guide post, 12 a front wheel which may have ordinary pedals 13, 14 rear wheels, and 15 steering mechanism of the improved toy. The rear wheels are mounted in any preferred manner on an axle 16 carried by the lower, rearward ends 17 of spaced apart supporting members 18, the upper, forward end portions 19 of said members 18 being secured to spacer strips 20 themselves fastened to the bottom face of the flat seat as indicated at 21. The supporting members 18 preferably extend vertically upward from their lower, rearward ends 17, as denoted at 22, thence said members extend forwardly desirably horizontally (at approximate right-angles to the portions 22), as denoted at 23, and thence again vertically upward, as denoted at 24, there preferably being a right-angle bend 25 between each vertical portion 24 and an upper, forward portion 19 secured to the flat seat.

As disclosed more clearly in Figs. 1 and 2, the vertical portions 22 of the supporting members are desirably of length to situate the horizontal portions 23 at some little distance above the rear wheels, and said horizontal portions are themselves at proper distance below the flat seat and of sufficient length to neatly accommodate a cart body directly back of the flat seat, in a manner to be now made clear, so that the upper portion of said cart body can be approximately in the horizontal plane of the flat seat, as it is shown in Fig. 1.

Figure 3:
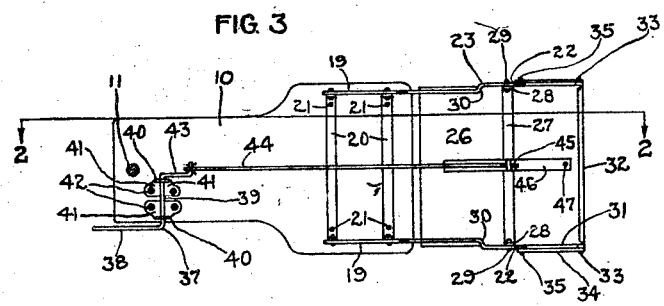
Fig. 3 is a sectional view on line 3—3 in Fig. 1.

Numeral 26 represents the cart body having a strap 27 secured to its under face, the strap having downwardly extending ears 28 at its opposite ends pivoted in any suitable or convenient manner, as by rivets 29, to the horizontal portions 23 of the supporting members 18, adjacent the rearward ends of said horizontal portions, the ears preferably lying between the portions 23 as best shown in Fig. 3. As very clearly disclosed, the strap 27 extends transversely of the cart body and is situated closer to its rear than to its front so that normally the front portion of said cart body will rest upon the horizontal portions 23 of the supporting members (although this need not be the case), said portions 23 being offset inwardly, as indicated at 30, at points adjacent and forwardly of the pivots for the cart body to lie well within the confines of the base of said body, as will be understood.

The cart body has sides 31 and a tail gate 32 pivoted to the upper, rearward corners of the sides as at 33. Links 34 pivoted to the vertical portions 22 of the supporting members, adjacent the upper ends of said vertical portions, as at 35, and to the edges of the tail gate as at 36, hold the gate closed so long as the cart body rests upon the horizontal portions 23, as it is shown in Fig. 1. But when the cart body is swung on its pivot from the position of Fig. 1 to the position of Fig. 2, its rearward ends swings toward the pivotal points 35 to cause the links 34 to swing the toll gate on its pivots 33 to open position.

Figure 4:
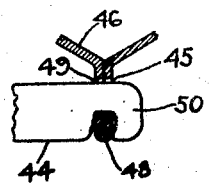
Fig. 4 is a detail disclosing a preferred manner of associating the connecting bar with the tension member of the cart body.

Mechanism is provided for operating the cart body from its normal position (as in Fig. 1) to its dumping position (as in Fig. 2), and vice versa, the mechanism including an arrangement for locking said cart body in a normal position. Of this mechanism, 37 represents a Z-shaped control lever including a hand piece 38 of any ordinary or preferred design, a shaft 39 desirably at right-angles to the hand piece and mounted in spaced apart ears 40 of a two-part bracket 41 secured as at 42 to the bottom face of the seat 10 adjacent its forward end, and an arm 43 preferably at right-angles to the shaft 39. The arm 43 is pivoted in some convenient manner to the forward end of a connecting bar 44 having its rearward end pivoted as at 45 to a tension member 46 secured to the bottom face of the base of the cart body. As disclosed, this tension member is a single piece of metal having divergent legs extending longitudinally of the toy and secured centrally of the cart body as at 47, each leg terminating in a web 48 common to both legs and having an opening 49 freely and rotatably receiving a hook portion 50 of the connecting bar 44, the bar being adapted to have pivotal movement in the web, and the web being designed to preclude accidental removal of the hook portion of the bar. See Fig. 4.

Figure 2:
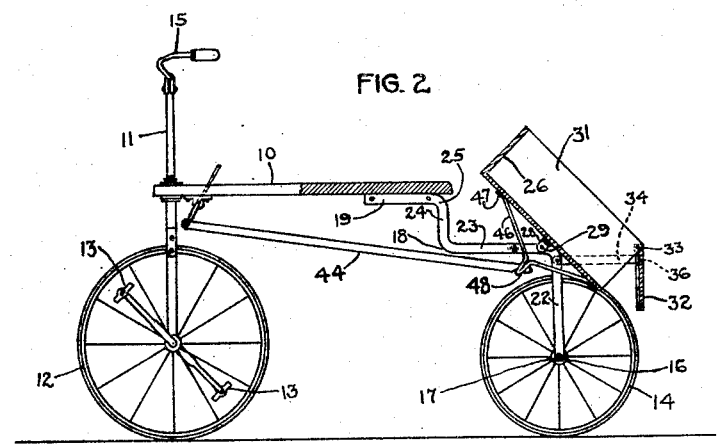
Fig. 2 is a longitudinal sectional view, taken as on line 2—2 in Fig. 3, but showing the cart body in dumping position.

The manner of manipulating the cart body will be evident from Figs. 1 and 2. By swinging the hand piece from either of its positions of Fig. 1 to its position of Fig. 2, the control lever moves the connecting bar forwardly to cause the cart body, through its tension member, to rotate upon its pivots 29, thus tilting the cart body to dumping position, the tail gate functioning in the manner already set forth. By returning the hand piece from its position of Fig. 2 to either of its positions of Fig. 1, the cart body is returned to normal position.

The ears 40 of the two-part bracket mount the shaft 39 of the Z-shaped control lever at a slight distance from the bottom face of the toy seat, and when the control lever has been moved from its position of Fig. 2 to its dotted line position of Fig. 1, the cart body is resting upon the horizontal portions 23 of the supporting members 18. In Fig. 1 the dotted lines show the arm 43 of the control lever and the connecting bar in alignment. Evidently, movement of the control lever from its dotted line position in Fig. 1 toward its full line position in said figure throws the connecting bar beyond the dead center position of the control lever. The arrangement is such that the movement of the control lever from a position in advance of the dotted line position as shown to a position beyond said dotted line position (toward the full line position) is against the natural resiliency of the tension member, and when the control lever has passed its dead center position, it is carried to the full line position in Fig. 1, directly against the bottom face of the toy seat. Clearly, the cart body is thus locked in normal position. Any force exerted to dump it, except by manipulation of the control lever, only exerts pressure against the botom face of the seat.

The two-part bracket as fully described is essential to the assembly with the Z-shaped lever of efficient and practical means for mounting said control lever upon the toy seat.

Having thus fully described the invention, what I claim as new and desire to secure by Letters Patent is:

1. In a dump cart of the character described, a frame, a cart body pivotally mounted thereon, a tail gate pivoted to said cart body, a link pivoted to the frame and to the tail gate, means consisting of a tension member on said body, a control lever, a connecting bar between the control lever and tension member for swinging the cart body on its pivot to tilt said body and thus swing the tail gate on its pivot away from the cart body, and means consisting of said connecting bar when moved against the resiliency of said tension member beyond a dead center position of said control lever and a fixed part upon said dump cart limiting movement of said connecting bar beyond said dead center position for locking the cart body in normal, untilted position.

2. In a dump cart of the character described, a frame, a cart body pivotally mounted thereon and provided with a pivoted tail gate, a control lever, a member secured to the base of the cart body, a connecting bar between and pivotally attached to the control lever and member, the pivoted connection between said connecting bar and said member consisting of a hook portion upon said connecting bar removably inserted in an opening in said member, and a link pivoted to the frame and to the tail gate, whereby actuation of the control lever causes the cart body to tilt and the tail gate to swing on its pivot away from the cart body.

Signed at Bridgeport, in the county of Fairfield, and State of Connecticut, this 11th day of June, A. D., 1924.

ANDROV H. CARLSON.